US012334829B2

(12) United States Patent
Tsuno et al.

(10) Patent No.: US 12,334,829 B2
(45) Date of Patent: Jun. 17, 2025

(54) DC-DC CONVERTER THAT CONVERTS DIRECT CURRENT INTO ANOTHER DIRECT CURRENT

(71) Applicant: HONDA MOTOR CO., LTD., Tokyo (JP)

(72) Inventors: Koichi Tsuno, Wako (JP); Toshio Inoue, Wako (JP); Ryo Oshima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 264 days.

(21) Appl. No.: 18/140,999

(22) Filed: Apr. 28, 2023

(65) Prior Publication Data
US 2023/0261579 A1    Aug. 17, 2023

Related U.S. Application Data

(63) Continuation of application No. PCT/JP2020/046470, filed on Dec. 14, 2020.

(51) Int. Cl.
H02M 3/335    (2006.01)
H02M 1/00    (2006.01)
H02M 1/14    (2006.01)

(52) U.S. Cl.
CPC ..... *H02M 3/33515* (2013.01); *H02M 1/0009* (2021.05); *H02M 1/0032* (2021.05); *H02M 3/33573* (2021.05); *H02M 1/14* (2013.01)

(58) Field of Classification Search
CPC ............ H02M 3/335; H02M 3/33507; H02M 3/33515; H02M 3/33569; H02M 3/3353;

(Continued)

(56) References Cited

U.S. PATENT DOCUMENTS 8,335,097 B2    12/2012 Yamashita
8,675,891 B2 *   3/2014 Odaohhara ........... H02M 3/158
                                                         381/94.1

(Continued)

FOREIGN PATENT DOCUMENTS

JP    2002-153055 A    5/2002
JP    2010-104170 A    5/2010

(Continued)

OTHER PUBLICATIONS

International Search Report dated Feb. 9, 2021, issued in counterpart International Application No. PCT/JP2020/046470, with English Translation. (5 pages).

*Primary Examiner* — Thienvu V Tran
*Assistant Examiner* — Shahzeb K Ahmad
(74) *Attorney, Agent, or Firm* — WHDA, LLP

(57) ABSTRACT

A control circuit includes a first mode for thinning out pulses of a drive signal according to an input current, a hybrid mode combining pulse width control that controls a pulse width of the drive signal and intermittent control that thins out pulses of the drive signal, and a second mode for thinning out the pulses according to an output voltage. The control circuit selects the second mode when a duty ratio of the drive signal is a predetermined threshold or less, selects the hybrid mode when the duty ratio of the drive signal exceeds the predetermined threshold and the input voltage is a predetermined specified value or more, and selects the first mode when the duty ratio of the drive signal exceeds the predetermined threshold and the input voltage is less than the predetermined specified value.

5 Claims, 5 Drawing Sheets

(58) Field of Classification Search
CPC ......... H02M 3/33538; H02M 3/33546; H02M 3/33553; H02M 3/33571; H02M 3/33573; H02M 3/337; H02M 3/156; H02M 3/158; H02M 3/1582; H02M 1/0003; H02M 1/0009; H02M 1/0019; H02M 1/0022; H02M 1/0032; H02M 1/0054; H02M 1/14; H02M 1/32; H02M 1/36
See application file for complete search history.

(56) References Cited

U.S. PATENT DOCUMENTS

| | | | |
|---|---|---|---|
| 9,831,786 | B2 | 11/2017 | Okayama et al. |
| 2014/0307480 | A1* | 10/2014 | Hamamoto ......... H02M 3/3376 363/17 |
| 2015/0349643 | A1 | 12/2015 | Houston et al. |
| 2015/0349645 | A1 | 12/2015 | Wei et al. |
| 2017/0085259 | A1* | 3/2017 | Hayakawa ............... H02M 1/44 |
| 2018/0054122 | A1* | 2/2018 | Takeya .................. H02M 3/157 |
| 2019/0097525 | A1* | 3/2019 | Nakao ............... H02M 3/33515 |
| 2019/0207524 | A1* | 7/2019 | Mnich ............... H02M 3/33573 |

FOREIGN PATENT DOCUMENTS

| | | |
|---|---|---|
| JP | 2011-4550 A | 1/2011 |
| JP | 2016-63621 A | 4/2016 |
| WO | 2016/114379 A1 | 7/2016 |

\* cited by examiner

DC-DC CONVERTER THAT CONVERTS DIRECT CURRENT INTO ANOTHER DIRECT CURRENT

CROSS-REFERENCE TO RELATED APPLICATION(S)

This application is a continuation of International Patent Application No. PCT/JP2020/046470 filed on Dec. 14, 2020, the entire disclosure of which is incorporated herein by reference.

BACKGROUND OF THE INVENTION

Field of the Invention

The present invention relates to a DC-DC converter that converts a direct current into another direct current.

Description of the Related Art

A DC-DC converter is a conversion circuit that converts a direct current (DC) input voltage into a required constant direct current output voltage. Japanese Patent Laid-Open No. 2016-063621 describes that when a DC-DC converter is in a light load state, a switching element is intermittently operated.

In the light load state, a pulse width of a drive signal supplied to a gate of the switching element becomes very narrow. Therefore, in order to accurately detect an output current used to determine that the DC-DC converter is in the light load state, a highly accurate integrated circuit (IC) is required. Therefore, it is required to detect the light load state at low cost without using an expensive IC. In addition, in a DC-DC converter used for a power supply device such as an engine-driven generator, a time period of a no-load state may be long. Therefore, it is also required to improve the efficiency of the DC-DC converter in the no-load state.

SUMMARY OF THE INVENTION

The present disclosure provides a DC-DC converter comprising:
a conversion circuit configured to convert a direct current input voltage supplied from a direct current power supply into a direct current output voltage;
a current detection circuit configured to detect an input current supplied from the direct current power supply to the conversion circuit;
an input voltage detection circuit configured to detect the input voltage;
an output voltage detection circuit configured to detect the output voltage; and
a control circuit configured to control the output voltage by supplying a pulse-shaped drive signal to the conversion circuit,
wherein the control circuit includes:
a first intermittent control mode configured to thin out pulses of the drive signal according to the input current;
a hybrid control mode combining pulse width control that controls a pulse width of the drive signal and intermittent control that thins out pulses of the drive signal; and
a second intermittent control mode configured to thin out the pulses of the drive signal according to the output voltage, and the control circuit
selects the second intermittent control mode in a case where a duty ratio of the drive signal is a predetermined threshold or less,
selects the hybrid control mode in a case where the duty ratio of the drive signal exceeds the predetermined threshold and the input voltage is a predetermined specified value or more, and
selects the first intermittent control mode in a case where the duty ratio of the drive signal exceeds the predetermined threshold and the input voltage is less than the predetermined specified value.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Figure 1:
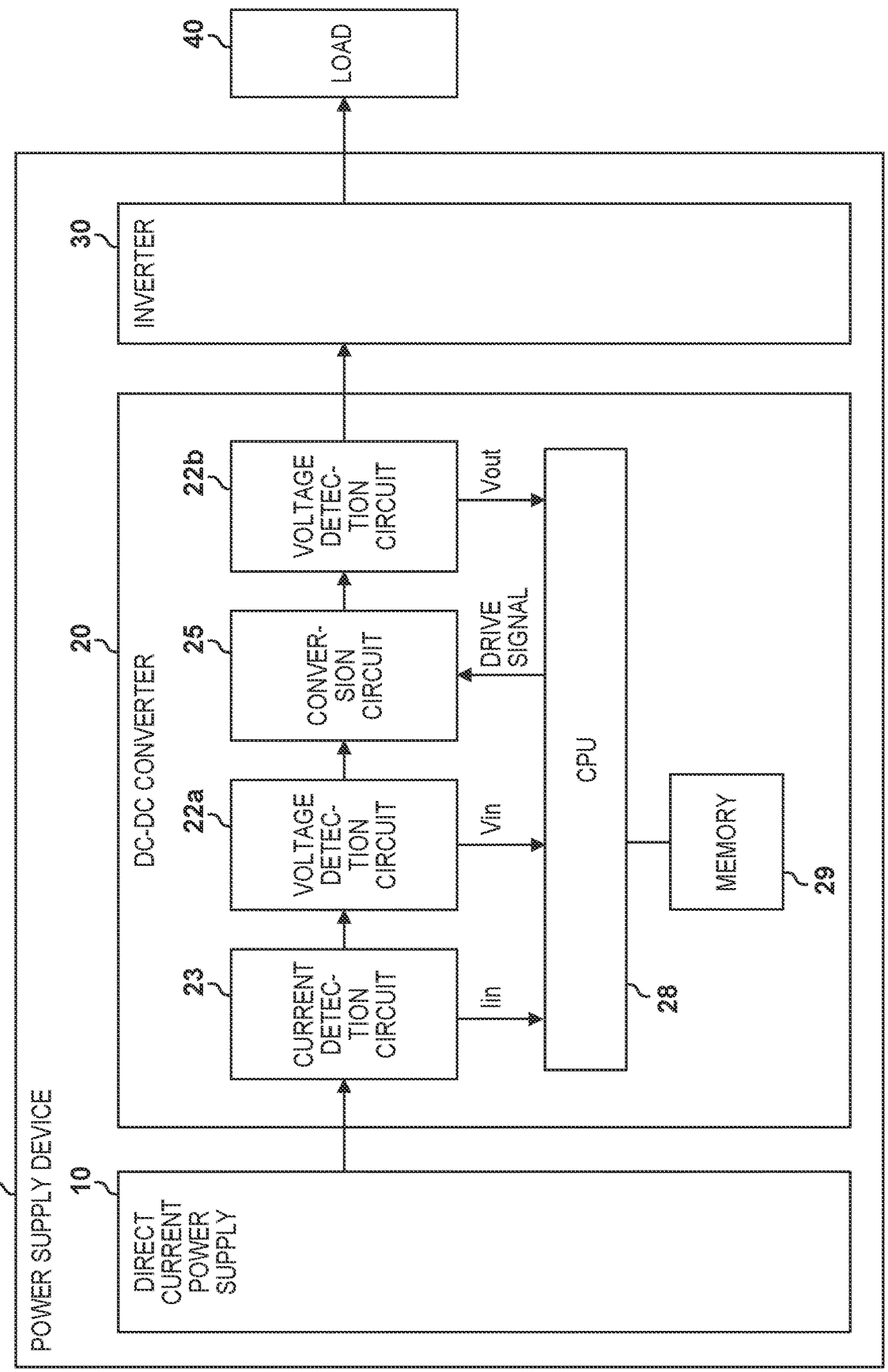
FIG. 1 is a block diagram illustrating a power supply device.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

<Power Supply Device>

FIG. 1 illustrates a power supply device 1. The power supply device 1 includes a direct current power supply 10, a DC-DC converter 20, and an inverter 30. The direct current power supply 10 is a battery, an engine-driven generator, or the like. Here, it is assumed that the direct current power supply 10 of a battery type is employed. The DC-DC converter 20 converts a direct current input voltage Vin supplied from the direct current power supply 10 into a direct current output voltage Vout and outputs the direct current output voltage Vout to the inverter 30. The inverter 30 converts the output voltage Vout supplied from the DC-DC converter 20 into an alternating current output voltage Vac and supplies the alternating current output voltage Vac to a load 40.

In the DC-DC converter 20, a current detection circuit 23 is a circuit that detects an input current Iin from the direct current power supply 10 and outputs a detection result to an AD port of a CPU 28. The AD port is a port including an AD converter that converts an analog signal into a digital signal. The current detection circuit 23 includes, for example, a shunt resistor (resistor for current detection). A voltage detection circuit 22a is a circuit that detects the input voltage Vin from the direct current power supply 10 and outputs a detection result to the CPU 28. The voltage detection circuit 22a includes, for example, a plurality of voltage dividing resistors that convert the input voltage Vin into a detection voltage proportional to the input voltage Vin.

A conversion circuit 25 is a circuit that converts the input voltage Vin into the output voltage Vout. The conversion circuit 25 may be a switching converter including a switching circuit (for example, a full-bridge circuit with four field-effect transistors), a transformer, a rectifier circuit (for example, a bridge diode), a smoothing circuit (for example, an electrolytic capacitor), and the like. The CPU 28 controls the output voltage Vout to be a target voltage Vtar by controlling a drive signal input to the conversion circuit 25. The drive signal is, for example, a pulse signal (signal that have been subjected to pulse width modulation (PWM)). Such a drive signal is individually supplied to each of four switching elements constituting the switching circuit provided in the conversion circuit 25. The conversion circuit 25 includes a transformer T1. A winding ratio n of the transformer T1 is determined so that a predetermined maximum output voltage (for example, 40 V) is output with respect to a predetermined minimum input voltage (for example, 200 V) for the DC-DC converter 20.

The CPU 28 executes various types of processing in accordance with a control program stored in a memory 29. For example, the CPU 28 may obtain power consumption Pin in the DC-DC converter 20 on the basis of the detection result of the input current Iin and the detection result of the input voltage Vin and determine a load state on the basis of the power consumption Pin. As described above, the input current Iin and the power consumption Pin can be used as indices for determining the load 40. The power consumption Pin may be referred to as input power.

[Functions of CPU]

Figure 2:
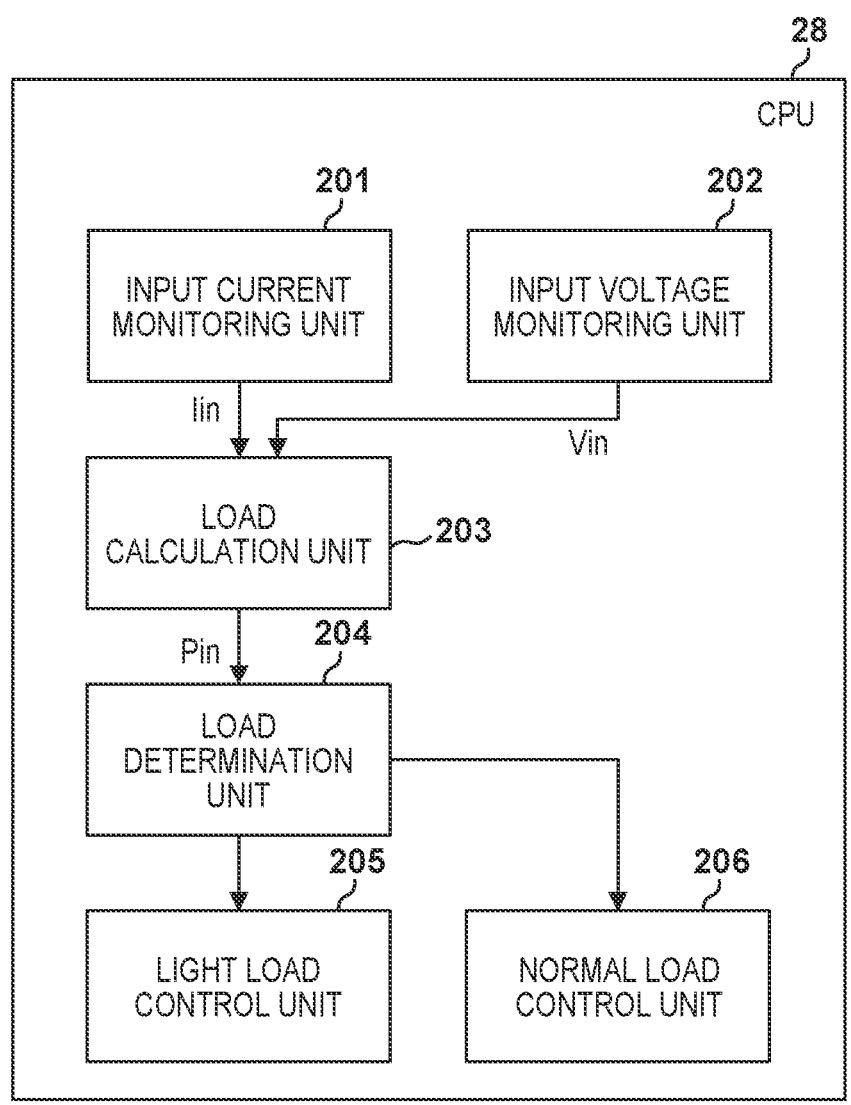
FIG. 2 is a block diagram illustrating functions of a CPU.

FIG. 2 illustrates functions involved in the control of the output voltage Vout. The CPU 28 implements the functions described below by executing the control program. Here, some or all of the functions described below may be implemented by a hardware circuit such as an application specific integrated circuit (ASIC) or a field programmable gate array (FPGA). Furthermore, the CPU 28 may include one or a plurality of processor circuits. As described above, each of the functions may be implemented by a logic circuit or a program module.

An input current monitoring unit 201 monitors the input current Iin detected by the current detection circuit 23. When an acquisition condition of the input current Iin is satisfied, the input current monitoring unit 201 acquires the detection result of the input current Iin from the current detection circuit 23. The input current monitoring unit 201 may be an analog-to-digital conversion circuit. An input voltage monitoring unit 202 monitors the input voltage Vin detected by the voltage detection circuit 22a. When an acquisition condition of the input voltage Vin is satisfied, the input voltage monitoring unit 202 acquires the detection result of the input voltage Vin from the current detection circuit 23. The input voltage monitoring unit 202 may be an analog-to-digital conversion circuit. A load calculation unit 203 calculates a load state (for example, Pin=Iin×Vin) on the basis of the input current Iin and the input voltage Vin. Not that the load calculation unit 203 may calculate the load state using only the input current Iin. A mathematical expression for calculating the load state from the input current Iin may be held in a ROM area of the memory 29. A load determination unit 204 determines whether the load state is a light load or a normal load. For example, in a case where the power consumption Pin correlated with the load state is less than a load threshold Pth, the load determination unit 204 may determine that the load state is a light load. In a case where the power consumption Pin correlated with the load state is the load threshold Pth or more, the load determination unit 204 may determine that the load state is a normal load.

A light load control unit 205 controls the conversion circuit 25 in a case where the load state is a light load. A normal load control unit 206 controls the conversion circuit 25 in a case where the load state is a normal load. The normal load control unit 206 controls a pulse width D of the drive signal so that the output voltage Vout becomes the target voltage Vtar (pulse width control). As described above, the load determination unit 204 selects one of the light load control unit 205 and the normal load control unit 206 or sets one of the light load control unit 205 and the normal load control unit 206 to active (enabled) according to the load state.

Figure 3:
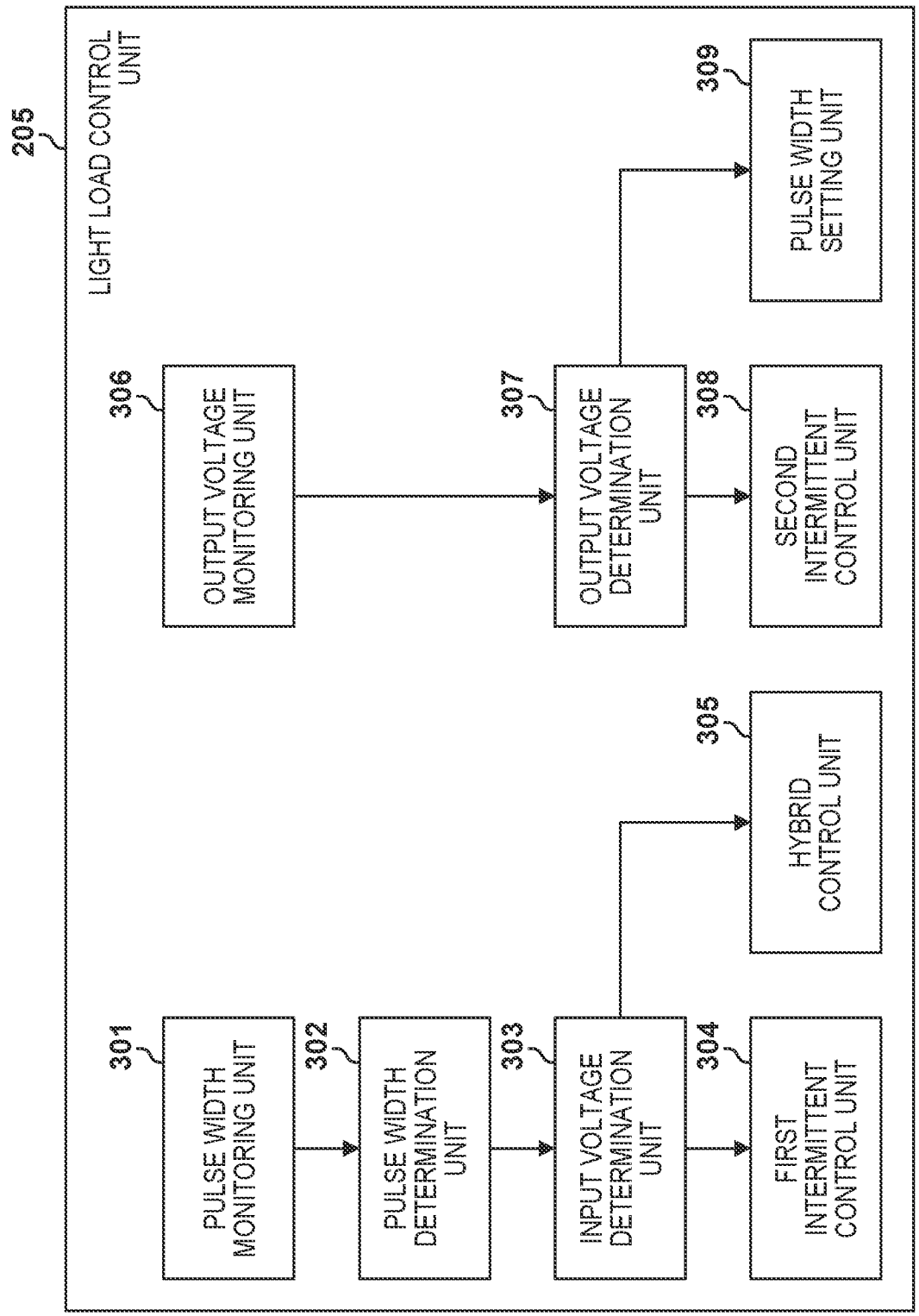
FIG. 3 is a block diagram illustrating functions of the CPU.

FIG. 3 illustrates details of the light load control unit 205. A pulse width monitoring unit 301 acquires and monitors the pulse width D of the drive signal. For example, the pulse width monitoring unit 301 may read the pulse width D determined by the CPU 28 and stored in a RAM area of the memory 29. The pulse width determination unit 302 determines whether the pulse width D exceeds a threshold Dth. The threshold Dth may be determined in advance and may be stored in the ROM area of the memory 29.

In general, the pulse width D is reduced in a case where the output voltage Vout exceeds the target voltage Vtar. In addition, the pulse width D is increased in a case where the output voltage Vout does not exceed the target voltage Vtar. In a steady state in which the output voltage Vout is maintained at the target voltage Vtar, when the input voltage Vin decreases, the pulse width D is increased. Similarly, in the steady state, when the input voltage Vin increases, the pulse width D is reduced. Furthermore, as the load 40 increases, the pulse width D is increased because more current is required. Furthermore, as the load 40 decreases, the pulse width D also is decreased. When the load 40 becomes a light load, the pulse width D may become extremely short. In other words, a duty ratio of the drive signal may be, for example, 0.1 (=10%) or less. For example, the pulse width D may be several nanoseconds. In such a light load state, it is difficult to detect a necessary current value. In general, an integrated circuit (current detection IC) for current detection can only detect signals up to 1 MHz in terms of frequency. Therefore, when the pulse width D exceeds the threshold Dth, the conversion efficiency of the DC-DC converter 20 is improved by executing intermittent control on the basis of the input current Iin. Meanwhile, in a case where the pulse width D is the threshold Dth or less, the detection accuracy of the input current Iin decreases. Therefore, intermittent control according to the output voltage Vout is executed. Here, the intermittent control refers to thinning out pulses of the drive signal.

Here, the pulse width D is used to be replaceable with the duty ratio. Therefore, the pulse width D may mean the duty ratio or a duration (ON time period) of the pulse.

In a Case where the Pulse Width D Exceeds the Threshold Dth

An input voltage determination unit 303 determines whether the input voltage Vin is less than a threshold Vth1. When a charge amount of the battery provided in the direct current power supply 10 decreases, the input voltage Vin decreases. Therefore, when the input voltage Vin becomes less than the threshold Vth1, a first intermittent control unit 304 executes the intermittent control of the drive signal on the basis of the input current Iin. The first intermittent control unit 304 appropriately thins out the pulse of the drive signal according to the input current Iin to maintain the output voltage Vout at the target voltage Vtar.

Meanwhile, in a case where the input voltage Vin is the threshold Vth1 or more, a hybrid control unit 305 executes the drive signal. The hybrid control unit 305 executes control combining pulse width control and partial intermittent control. For example, the hybrid control unit 305 maintains the output voltage Vout at the target voltage Vtar by thinning out the pulses of the drive signal as necessary while adjusting the pulse width D within a range in which the pulse width D is not the threshold Dth or less. For example, the hybrid control unit 305 sets the pulse width D (duty ratio) to an upper limit value (for example, 90%) and maintains the output voltage Vout at the target voltage Vtar by thinning out the pulses. In a case where the output voltage Vout cannot be decreased to the target voltage Vtar even if the pulses are thinned out, the hybrid control unit 305 reduces the pulse width D.

An output voltage monitoring unit 306 acquires or monitors a detection result of the output voltage Vout output from the voltage detection circuit 22b. An output voltage determination unit 307 determines whether the output voltage Vout exceeds a threshold Vth2. A rated voltage (specification) is determined for the DC-DC converter 20. The rated voltage is determined as, for example, 165±10 V. In this example, the threshold Vht2 is set to 155 V that is a lower limit value. When the pulse width D becomes extremely short, the detection accuracy of the input current Iin decreases. Therefore, a second intermittent control unit 308 executes the intermittent control of the drive signal on the basis of the output voltage Vout. In other words, in a case where the pulse width D is extremely short and the output voltage Vout exceeds the threshold Vth2, the pulse width D cannot be reduced. Therefore, the pulses of the drive signal are thinned out according to the output voltage Vout. Meanwhile, when the pulse width D is extremely short, the output voltage Vout may not exceed the threshold Vth2. In this case, a pulse width setting unit 309 increases the pulse width D of the drive signal to maintain the output voltage Vout at the target voltage Vtar.

Incidentally, the first intermittent control unit 304, the hybrid control unit 305, and the second intermittent control unit 308 may thin out the pulses of the drive signal. For example, in a case where the frequency of the drive signal is 100 kHz and pulses are thinned out in three of four consecutive periods, the frequency of the drive signal is partially 25 kHz. When the frequency decreases below 25 kHz, an audible sound (a sound wave of 20 kHz or less) is generated from the transformer T1 by the drive signal, and a human can hear the audible sound. This can be noise. Therefore, when the pulses are thinned out, the CPU 28 sets a pulse thinning-out rate (thinning-out period) so that the frequency of the drive signal exceeds the frequency of the audible sound.

<Flowchart>

Figure 4:
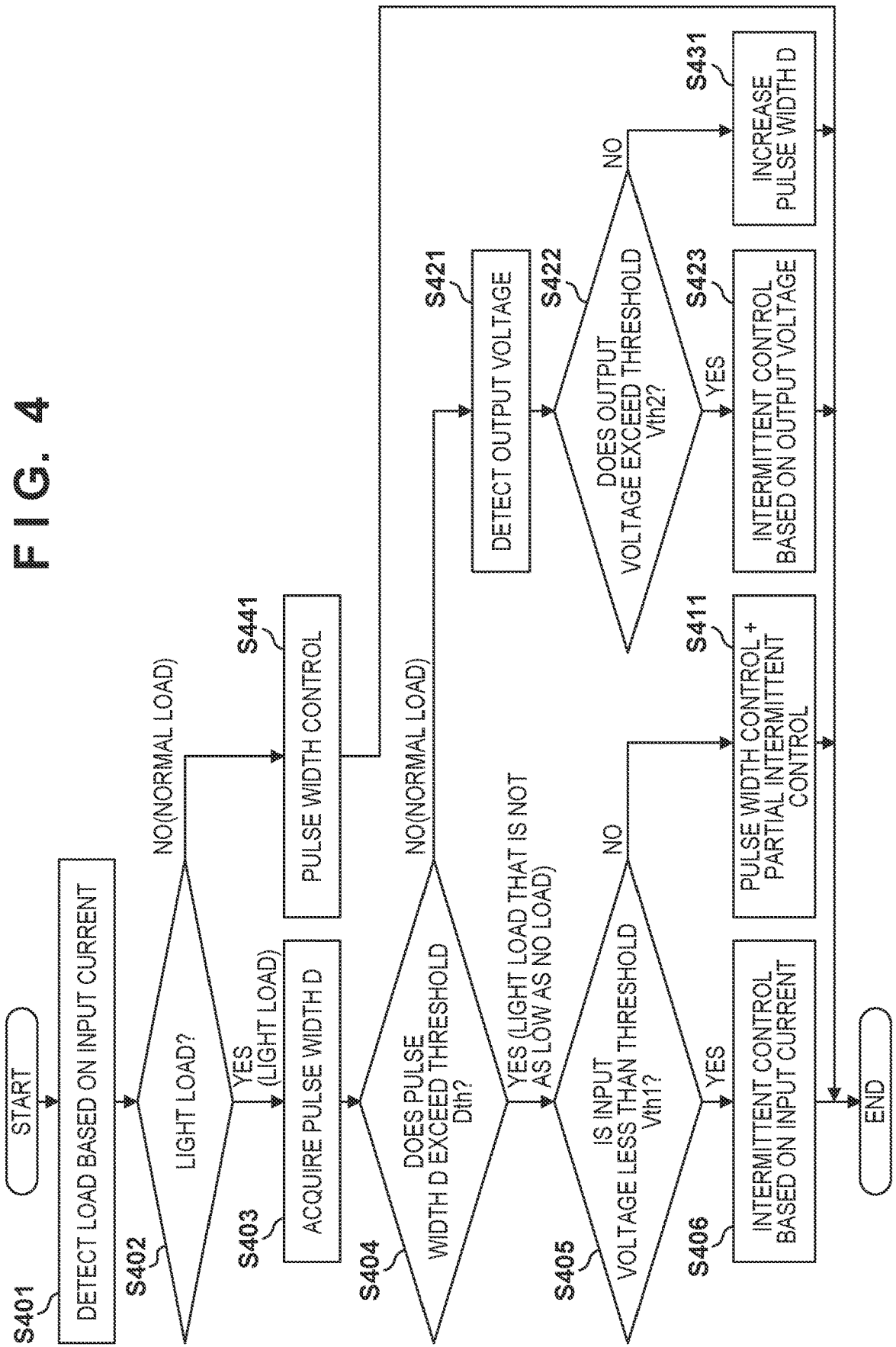
FIG. 4 is a flowchart illustrating a method for controlling a DC-DC converter.

FIG. 4 illustrates a series of processing executed by the CPU 28 according to the control program. Hereinafter, a pulse period of the drive signal is basically constant.

In step S401, the CPU 28 (input current monitoring unit 201 and load calculation unit 203) detects the load 40 on the basis of the input current Iin. For example, in a case where the load 40 is expressed by the power consumption Pin, the CPU 28 (input current monitoring unit 201 and input voltage monitoring unit 202) detects the input current Iin and the input voltage Vin. The load calculation unit 203 calculates the power consumption Pin that is a parameter indicating a load state on the basis of the input current Iin and the input voltage Vin.

In step S402, the CPU 28 (load determination unit 204) determines whether the load 40 is a light load. For example, in a case where the power consumption Pin is less than the load threshold Pth, the load determination unit 204 determines that the load 40 is a light load. In a case where the power consumption Pin is the load threshold Pth or more, the load determination unit 204 determines that the load 40 is a normal load. In a case where the load state is not a light load, the CPU 28 proceeds to step S441. In step S441, the CPU 28 (normal load control unit 206) executes pulse width control. The normal load control unit 206 adjusts the pulse width D of the drive signal so that the output voltage Vout is maintained at the preset target voltage Vtar. In a case where the load state is a light load, the CPU 28 proceeds to step S403.

In step S403, the CPU 28 (light load control unit 205 and pulse width monitoring unit 301) acquires the pulse width D of the drive signal. As described above, since the present pulse width D is held in the RAM area of the memory 29, the CPU 28 acquires the pulse width D from the memory 29. The pulse width D may be calculated from the input voltage Vin, the output voltage Vout, and the winding ratio n of the transformer T1 ($D=Vout/(n \times Vin)$). The winding ratio n of the transformer T1 is stored in the ROM area of the memory 29.

In step S404, the CPU 28 (pulse width determination unit 302) determines whether the pulse width D exceeds the predetermined threshold Dth. In a case where the pulse width D exceeds the predetermined threshold Dth, the CPU 28 proceeds to step S405. Here, in a case where the pulse width D is the duty ratio, the threshold Dth can be set to, for example, 0.1 (that is, 10%).

In step S405, the CPU 28 (input voltage determination unit 303) determines whether the input voltage Vin is less than the predetermined threshold Vth1. In a case where the input voltage Vin is less than the predetermined threshold Vth1, the CPU 28 proceeds to step S406. The threshold Vth1 is set to, for example, 60 V.

In step S406, the CPU 28 (first intermittent control unit 304) executes intermittent control based on the input current Iin. In other words, the first intermittent control unit 304 thins out the pulses of the drive signal according to the input current Iin so that the output voltage Vout is maintained at the target voltage Vtar. However, the CPU 28 thins out the pulses within a range in which audible sound is not generated. The pulse period of the drive signal is constant. Here, the pulse width D is increased until the output voltage Vout reaches the target voltage Vtar. When the output voltage Vout reaches the target voltage Vtar, the pulse width D is fixed. Thereafter, when the output voltage Vout exceeds the target voltage Vtar, the pulses of the drive signal are thinned out. As a result, the output voltage Vout is maintained at the target voltage Vtar. Note that a control table that holds a relationship between the input current Iin and an amount of thinning out of the pulses may be held in the ROM region of the memory 29. The CPU 28 may refer to this table to determine the amount of thinning out of the pulses on the basis of the input current Iin.

When it is determined in step S405 that the input voltage Vin is the predetermined threshold Vth1 or more, step S411 is executed. In step S411, the CPU 28 (hybrid control unit 305) executes hybrid control combining pulse width control and partial intermittent control. The hybrid control unit 305 sets 90% as an initial value of the pulse width D (duty ratio). The hybrid control unit 305 thins out the pulses of the drive signal so that the output voltage Vout is maintained at the target voltage Vtar. However, the hybrid control unit 305 gradually increases the pulse thinning-out period (thinning-out frequency decreases) within a range in which no ripple occurs in the output voltage Vout and no audible sound is generated. When the thinning-out frequency is 20 kHz, many humans can recognize sound. Therefore, a lower limit value of the thinning-out frequency may be set to, for example, 25 kHz. Even if the thinning-out frequency is decreased to the lower limit value, the output voltage Vout may not reach the target voltage Vtar. In this case, the hybrid control unit 305 gradually reduces the pulse width D from the initial value. The pulse period of the drive signal is constant.

The ROM area of the memory 29 may store a control table for determining the pulse width D. For example, the control table may hold a relationship between the input voltage Vin and the amount of thinning out of the pulses. Alternatively, the control table may hold a relationship between the input power (input voltage Vin×input current Iin) and the amount of thinning out of the pulses. The CPU 28 may obtain the amount of thinning out of the pulses from the control table by referring to the control table on the basis of the input voltage Vin.

In step S404, in a case where the pulse width D is the threshold Dth or less (for example, in the case of no load), the CPU 28 proceeds to step S421. In step S421, the CPU 28 (output voltage monitoring unit 306) detects the output voltage Vout.

In step S422, the CPU 28 (output voltage determination unit 307) determines whether the output voltage Vout exceeds the predetermined threshold Vth2. When the output voltage Vout exceeds the predetermined threshold Vth2, the CPU 28 proceeds to step S423. The threshold Vth2 is set to, for example, 155 V.

In step S423, the CPU 28 (second intermittent control unit 308) executes intermittent control on the basis of the output voltage Vout. The second intermittent control unit 308 thins out the pulses of the drive signal on the basis of the output voltage Vout so that the output voltage Vout is maintained at the target voltage Vtar. In other words, the thinning-out frequency of the pulses is determined on the basis on the output voltage Vout. The pulse period of the drive signal is constant. Note that a control table that holds a relationship between the output voltage Vout and the amount of thinning out of the pulses may be held in the ROM area of the memory 29. The CPU 28 may refer to this table to determine the amount of thinning out of the pulses on the basis of the output voltage Vout.

In a case where the output voltage Vout is the predetermined threshold Vth2 or less in step S422, the CPU 28 proceeds to step S431. In step S431, the CPU 28 (pulse width setting unit 309) increases the pulse width D. As a result, the output voltage Vou exceeds the threshold Vth2 and approaches the target voltage Vtar.

SUMMARY

[Viewpoint 1]

As illustrated in FIG. 1, the conversion circuit 25 is a circuit that converts the direct current input voltage Vin supplied from the direct current power supply 10 into the direct current output voltage Vout. The current detection circuit 23 is a circuit that detects the input current Iin supplied from the direct current power supply 10 to the conversion circuit 25. The voltage detection circuit 22a functions as an input voltage detection circuit that detects the input voltage Vin. The voltage detection circuit 22b functions as an output voltage detection circuit that detects the output voltage Vout. The CPU 28 functions as a control circuit that controls the output voltage Vout by supplying a pulse-shaped drive signal to the conversion circuit 25. The control circuit may have a plurality of control modes. As described with reference to S406, a first intermittent control mode is a control mode in which the pulses of the drive signal are thinned out according to the input current Iin. As described in connection with S411, a hybrid control mode is a control mode combining the pulse width control that controls the pulse width of the drive signal and the intermittent control that thins out the pulses of the drive signal. As described with reference to S423, a second intermittent control mode is a control mode in which the pulses of the drive signal are thinned out according to the output voltage Vout. The control circuit selects the second intermittent control mode in a case where the duty ratio (for example, pulse width D) of the drive signal is a predetermined threshold (for example, Dth) or less. The control circuit selects the hybrid control mode in a case where the duty ratio of the drive signal exceeds the predetermined threshold and the input voltage Vin is a predetermined specified value (for example, Vth1) or more. The control circuit is configured to select the first intermittent control mode in a case where the duty ratio of the drive signal exceeds the predetermined threshold and the input voltage Vin is less than the predetermined specified value. As described above, in a case where the load 40 is very light (for example, no load), the intermittent control (second intermittent control mode) is executed using the output voltage Vout without using the detection result of the input current Iin. Therefore, an expensive and highly accurate current detection IC becomes unnecessary. In addition, in the case of a light load that is not as low as no load, current detection accuracy may be low. In other words, the intermittent control based on the input current Iin detected by the current detection IC with low detection accuracy is executed (first intermittent control mode). In a case where the input voltage Vin is the predetermined specified value (for example, Vth1) or more, the hybrid control mode is selected. In the hybrid control mode, the pulses are thinned out while the pulse width D is secured to some extent. In general pulse width control, when the input voltage Vin increases, the output voltage Vout is maintained at the target voltage Vtar by reducing the pulse width D. In this case, in a light load, the duty ratio is less than 10%, the pulse width D is also several nanoseconds, and power conversion efficiency may decrease. Therefore, in the present invention, the pulses are thinned out in a state where the pulse width D is secured to some extent. It is considered that as a result, the power conversion efficiency will be improved. As described above, according to the present invention, the DC-DC converter 20 capable of improving the power conversion efficiency in the light load state at low cost is provided.

The hybrid control mode may be applied also when the input voltage Vin exceeds the threshold Vth1 in the normal load state. As a result, the power conversion efficiency will be improved.

In the second intermittent control mode, since the pulses are thinned out on the basis of the output voltage Vout, a ripple is less likely to increase. This will produce an effect of reducing the capacitance of an electrolytic capacitor for suppressing the ripple.

[Viewpoints 2 to 4]

In the first intermittent control mode and the second intermittent control mode, the output of the drive signal is temporarily stopped, whereby the pulses are thinned out every predetermined period longer than the pulse period of the drive signal. The predetermined period for thinning out the pulses is a period shorter than a period of the audible sound. For example, in a case where the frequency (switching frequency) of the drive signal is 100 kHz, one to three pulses among four consecutive pulses in the drive signal are thinned out. For example, in a case where three pulses are thinned out, the thinning-out frequency is 25 kHz, which exceeds 20 kHz that is the frequency of the audible sound. Therefore, even if the pulses are thinned out, a user will be less likely to feel noise. Thus, the frequency of the audible sound is 20 kHz. The control circuit determines the predetermined period for thinning out the pulses so that a constraint condition defined so as not to generate an audible sound of 20 kHz or less is satisfied. Note that the audible sound can be generated by a winding wire of the transformer T1 provided in the conversion circuit 25. This may also be referred to as sounding.

[Viewpoint 5]

Figure 5:
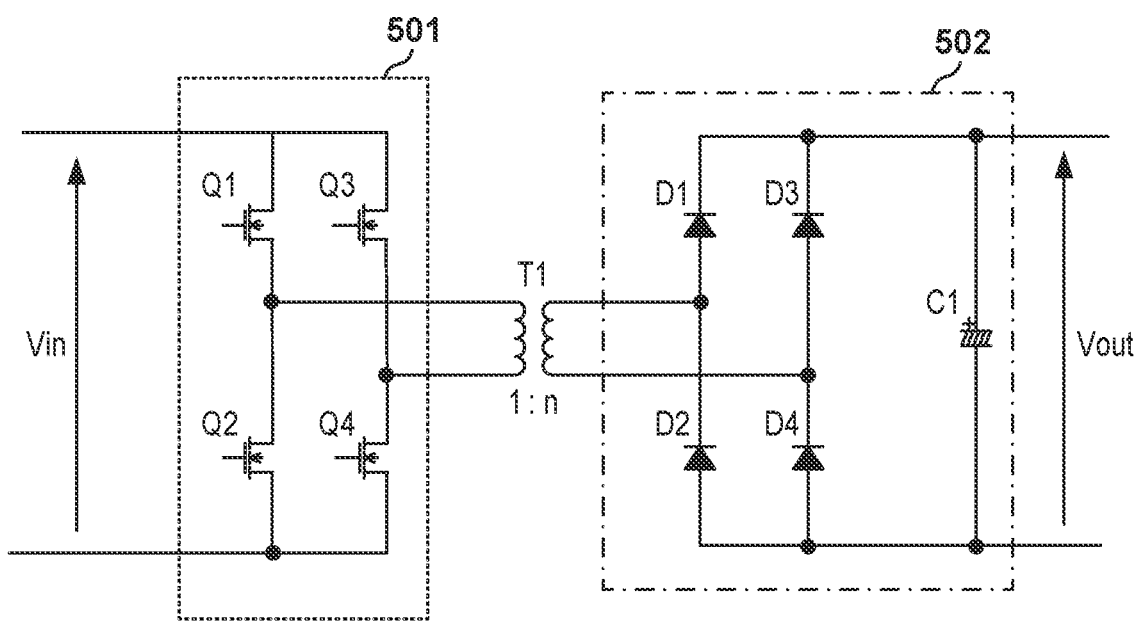
FIG. 5 is a block diagram illustrating a conversion circuit.

FIG. 5 illustrates an example of the conversion circuit 25. The switching circuit 501 is a circuit that switches the input voltage Vin supplied from the direct current power supply 10. The switching circuit 501 includes switching elements Q1, Q2, Q3, and Q4 of a MOSFET or the like. A transformer T1 is connected to the switching circuit 501. A rectifying and smoothing circuit 502 is connected to a secondary side of the transformer T1 and generates the output voltage Vout. The rectifying and smoothing circuit 502 includes a diode bridge (rectifying circuit) including diodes D1, D2, D3, and D4. The rectifying and smoothing circuit 502 includes an electrolytic capacitor C1. The electrolytic capacitor C1 is a smoothing circuit that smooths a pulsating flow output from the diode bridge to generate a direct current. The switching circuit 501 may be any of a full bridge circuit, a half bridge circuit, or the like.

The invention is not limited to the foregoing embodiments, and various variations/changes are possible within the spirit of the invention.

What is claimed is:

1. A DC-DC converter comprising:
   a conversion circuit configured to convert a direct current input voltage supplied from a direct current power supply into a direct current output voltage;
   a current detection circuit configured to detect an input current supplied from the direct current power supply to the conversion circuit;
   an input voltage detection circuit configured to detect the input voltage;
   an output voltage detection circuit configured to detect the output voltage; and
   a control circuit configured to control the output voltage by supplying a pulse-shaped drive signal to the conversion circuit,
   wherein the control circuit includes:
      a first intermittent control mode configured to thin out pulses of the drive signal according to the input current;
      a hybrid control mode combining pulse width control that controls a pulse width of the drive signal and intermittent control that thins out pulses of the drive signal; and
      a second intermittent control mode configured to thin out the pulses of the drive signal according to the output voltage, and
   the control circuit
      selects the second intermittent control mode in a case where a duty ratio of the drive signal is a predetermined threshold or less,
      selects the hybrid control mode in a case where the duty ratio of the drive signal exceeds the predetermined threshold and the input voltage is a predetermined specified value or more, and
      selects the first intermittent control mode in a case where the duty ratio of the drive signal exceeds the predetermined threshold and the input voltage is less than the predetermined specified value.

2. The DC-DC converter according to claim 1, wherein the first intermittent control mode and the second intermittent control mode include thinning out the pulses at every predetermined period longer than a pulse period of the drive signal by temporarily stopping output of the drive signal.

3. The DC-DC converter according to claim 2, wherein the predetermined period for thinning out the pulses is a period shorter than a period of an audible sound.

4. The DC-DC converter according to claim 3, wherein frequency of the audible sound is 20 kHz, and the control circuit determines the predetermined period for thinning out the pulse so that a constraint condition defined so as not to generate an audible sound of 20 kHz or less is satisfied.

5. The DC-DC converter according to claim 1, wherein the conversion circuit includes:
   a switching circuit configured to switch the input voltage supplied from the direct current power supply;
   a transformer connected to the switching circuit; and
   a rectifying and smoothing circuit connected to a secondary side of the transformer and configured to generate the output voltage.

\* \* \* \* \*